United States Patent
Sakamoto et al.

(10) Patent No.: US 12,210,264 B2
(45) Date of Patent: Jan. 28, 2025

(54) OPTICAL DEFLECTION DEVICE

(71) Applicant: Nippon Telegraph and Telephone Corporation, Tokyo (JP)

(72) Inventors: Takashi Sakamoto, Tokyo (JP); Yuichi Akage, Tokyo (JP); Sohan Kawamura, Tokyo (JP); Masahiro Ueno, Tokyo (JP); Soichi Oka, Tokyo (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 270 days.

(21) Appl. No.: 17/770,577

(22) PCT Filed: Nov. 7, 2019

(86) PCT No.: PCT/JP2019/043642
§ 371 (c)(1),
(2) Date: Apr. 20, 2022

(87) PCT Pub. No.: WO2021/090435
PCT Pub. Date: May 14, 2021

(65) Prior Publication Data
US 2022/0390809 A1 Dec. 8, 2022

(51) Int. Cl.
*G02F 1/29* (2006.01)
(52) U.S. Cl.
CPC ............................... *G02F 1/29* (2013.01)
(58) Field of Classification Search
None
See application file for complete search history.

(56) References Cited

U.S. PATENT DOCUMENTS

2017/0358899 A1* 12/2017 Toyoda ................. H01S 5/143

FOREIGN PATENT DOCUMENTS

| JP | 2002148541 A | 5/2002 |
|----|--------------|--------|
| JP | 2012150409 A | 8/2012 |
| JP | 6193773 B2 | 9/2017 |
| JP | 2017203847 A | 11/2017 |
| JP | 2017219732 A | 12/2017 |

OTHER PUBLICATIONS

Naganuma, K. et al., "Realization of high-resolution KTN optical beam scanner," NTT Technology Journal, vol. 21, No. 11, Dec. 2009, 9 pages.

* cited by examiner

*Primary Examiner* — Ryan Crockett
(74) *Attorney, Agent, or Firm* — Slater Matsil, LLP

(57) ABSTRACT

An optical deflection apparatus is provided with an optical deflection element and a compensating optical element. The optical deflection element deflects incident light in a first direction (a voltage application direction) in which a voltage is applied (one-dimensional scan). The compensating optical element is an element which has an incidence surface and an emission surface, which compensates for a deflection deviation in a second direction that is perpendicular to the first direction and to an optical axis of the incident light of deflected light having been deflected by the optical deflection element and incident from the incidence surface, and which arranges a direction of travel of compensated light to be emitted from the emission surface on a same plane.

20 Claims, 5 Drawing Sheets

PRIOR ART

OPTICAL DEFLECTION DEVICE

This patent application is a national phase filing under section 371 of PCT application no. PCT/JP2019/043642, filed on Nov. 7, 2019, which application is hereby incorporated herein by reference.

TECHNICAL FIELD

The present invention relates to an optical deflection apparatus and, more particularly, to an optical deflection apparatus using an electro-optic material.

BACKGROUND

Optical deflectors (optical deflection apparatuses) that change a direction in which light travels by applying an AC voltage such as a sine wave to a dielectric material (an electro-optic material) in a paraelectric phase are used in various fields such as laser printers and wavelength-swept light sources. For example, a wavelength-swept light source with an electro-optic crystal in the paraelectric phase (a dielectric crystal in the paraelectric phase) being arranged inside an optical resonator is proposed (refer to PTL 1). When applying an AC voltage for high-speed deflection to the electro-optic crystal, the wavelength-swept light source superimposes a DC voltage for filling a trap inside the electro-optic crystal with electrons as a bias voltage. The wavelength-swept light source configured in this manner is capable of suppressing fluctuations in a light output, a swept wavelength band, and a coherence length over a long period of time and has superior long-term stability.

In addition, a technique is proposed in which an AC drive voltage on which a DC voltage is superimposed as a bias voltage is applied while irradiating an electro-optic crystal with light from a light irradiator (refer to PTL 2). The proposal asserts that injection of electrons into a trap inside the electro-optic crystal enables time required for reaching a steady state to be reduced.

As electro-optic crystals having the characteristics described above, KTN ($KTa_{1-x}Nb_xO_3$) and KLTN ($K_{1-y}Li_yTa_{1-x}Nb_xO_3$) with high electro-optic effects are known. Hereinafter, when KTN and KLTN need not be distinguished from each other, the crystals will be collectively described as KTN. In particular, charges can be injected into KTN when a Ti material or a Cr material is used as an electrode, and a high-speed, wide-angle optical deflector can be realized utilizing an internal electric field created by the injected charges.

FIG. 10 shows a configuration of a conventional optical deflector using a KTN crystal (refer to PTL 3). FIG. 10 represents a configuration viewed from an incidence direction of light. A KTN crystal 11 has a top surface and a bottom surface being sandwiched by a graphite sheet 12a and a graphite sheet 12b and is held by two metallic blocks (electrode blocks) 13a and 13b. Electrode pairs (not illustrated) made up of a positive electrode and a negative electrode for applying a control voltage are formed on the top and bottom surfaces of the KTN crystal 11 that oppose each other, and the electrode pairs are electrically connected to a control voltage source via the graphite sheets 12a and 12b and the metallic blocks 13a and 13b which the electrode pairs are respectively in contact with. Due to voltage application from the control voltage source (not illustrated) and electrons injected into the KTN crystal 11, an electric field is generated inside the KTN crystal 11 and a refractive index distribution is created inside the KTN crystal 11. An optical axis of incident light is set so as to be orthogonal to a direction of the electric field, and a voltage is applied between the pair of electrodes to deflect the incident light.

The graphite sheets 12a and 12b are inserted in order to prevent breakage of the KTN crystal 11 due to vibrations when a high-frequency control voltage is applied to the KTN crystal 11. Pieces of aluminum nitride (AlN) 14a and 14b are inserted to both sides of the KTN crystal 11. AlN 14a and AlN 14b position the KTN crystal 11 and act as heat transfer materials for keeping temperatures of the two metallic blocks 13a and 13b uniform. A Peltier element 16 is arranged between the metallic block 13a and a support plate 15, and thermistors (temperature detectors) 17a and 17b are respectively embedded inside the metallic block 13a and the metallic block 13b.

A temperature control apparatus 18 detects a temperature using the thermistor 17a and the thermistor 17b, and keeps the KTN crystal 11 at an appropriate set temperature (a constant temperature) by heating or cooling the metallic block 13a using the Peltier element 16. The temperature control apparatus 18 detects the temperature by measuring resistance values of the thermistor 17a and the thermistor 17b being connected in series and keeps permittivity of the KTN crystal 11 constant.

CITATION LIST

Patent Literature

[PTL 1] Japanese Patent No. 6193773.
[PTL 2] Japanese Patent Application Laid-open No. 2017-219732.
[PTL 3] Japanese Patent Application Laid-open No. 2017-203847.

SUMMARY

Technical Problem

Generally, light has an intensity distribution on a cross section that is perpendicular to a direction of travel. Hereinafter, a center of gravity of the intensity distribution will be referred to as a "center of gravity position of light" or, more simply, a "position of light". Ideally, the optical deflector described earlier one-dimensionally changes (deflects) the direction of travel of light to a voltage application direction. However, it is never clear as to whether or not a deflection deviation in a direction perpendicular to the voltage application direction and to the optical axis of incident light has occurred. The occurrence of such a deflection deviation means that an ideal one-dimensional deflection operation is not being performed.

Embodiments of the present invention can solve the problem described above and an object thereof is to provide an optical deflection apparatus in which a deflection deviation in a direction perpendicular to a voltage application direction and to the optical axis of incident light is suppressed.

Means for Solving the Problem

An optical deflection apparatus according to embodiments of the present invention includes: an optical deflection element which deflects incident light in a first direction in which a voltage is applied; and a compensating optical element which has an incidence surface and an emission surface, which compensates for a deflection deviation in a second direction that is perpendicular to the first direction and to an optical axis of the incident light of deflected light having been deflected by the optical deflection element and incident from the incidence surface, and which arranges a direction of travel of compensated light to be emitted from the emission surface on a same plane.

Effects of Embodiments of the Invention

As described above, embodiments of the present invention can provide an optical deflection apparatus in which a deflection deviation in a direction perpendicular to a voltage application direction is suppressed by including a compensating optical element to which deflected light having been deflected by an optical deflection element is incident, which compensates for a deflection deviation in a second direction that is perpendicular to a first direction, and which arranges a direction of travel of compensated light to be emitted on a same plane.

DETAILED DESCRIPTION OF ILLUSTRATIVE EMBODIMENTS

Hereinafter, an optical deflection apparatus according to embodiments of the present invention will be described.

Figure 1:
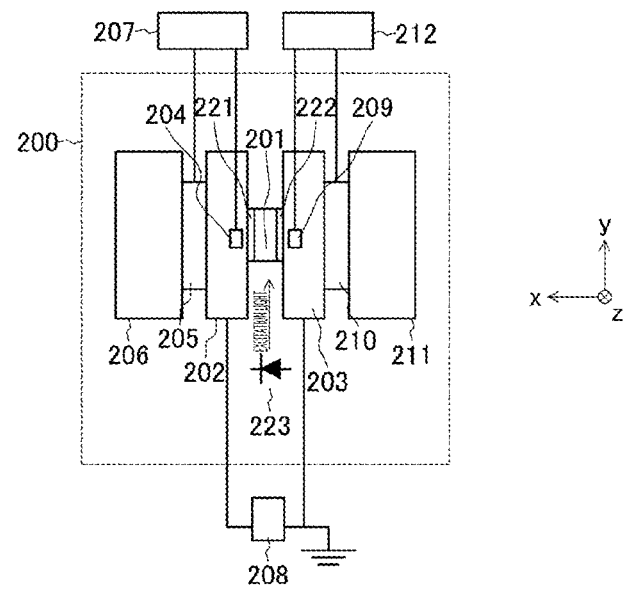
FIG. 1 is a diagram showing an optical deflector (an optical deflection element) using a KTN crystal, a first temperature control apparatus, a second temperature control apparatus, and a control voltage source.

First, a result of an evaluation of deflection characteristics of an optical deflection element using a KTN crystal will be described. In this evaluation, an optical deflector (an optical deflection element) 200, a first temperature control apparatus 207, a second temperature control apparatus 212, and a control voltage source 208 shown in FIG. 1 were used. Incident light was incident to the optical deflector 200 along a z axis. In the optical deflector 200, as an electro-optic material 201, a KTN crystal provided with electrodes spaced 2 mm apart was used. The KTN crystal has a rectangular parallelepiped shape with dimensions of 4.0×3.2×2.0 mm³. An electrode film (electrode) made of Ti/Pt/Au formed by vapor deposition is formed on a surface with an area of 4.0×3.2 mm².

When a voltage is applied to the electro-optic material 201, the electro-optic material 201 deforms due to an electrostrictive effect. A carbon sheet 221 and a carbon sheet 222 were arranged on either side of the electro-optic material 201 so as to prevent the electro-optic material 201 from breaking due to the deformation. The carbon sheet 221 was arranged between the electro-optic material 201 and a first metallic block 202 and the carbon sheet 222 was arranged between the electro-optic material 201 and a second metallic block 203.

A thermistor 204 is embedded inside the first metallic block 202. In addition, a first Peltier element 205 is attached to the first metallic block 202, and a first heat sink 206 is attached to the first Peltier element 205. The first temperature control apparatus 207 performs temperature control of the first metallic block 202 by adjusting a current supplied to the first Peltier element 205. In a similar manner, a thermistor 209 is embedded inside the second metallic block 203. In addition, a second Peltier element 210 is attached to the second metallic block 203, and a second heat sink 211 is attached to the second Peltier element 210. The second temperature control apparatus 212 performs temperature control of the second metallic block 203 by adjusting a current supplied to the second Peltier element 210.

The second temperature control apparatus 212 sets the temperature of the second metallic block 203 to be 37.58° C. Supposing that the temperature of the first metallic block 202 is set to a same temperature of 37.58° C., relative permittivity of the KTN crystal constituting the electro-optic material 201 was 17500. For the purpose of improving deflection characteristics of the optical deflector 200, the temperature of the first metallic block 202 was set to 39.08° C. and the electro-optic material 201 was provided with a temperature gradient. In other words, the temperature of the first metallic block 202 was set 1.5° C. higher than the temperature of the second metallic block 203.

By emitting light with a peak wavelength of 405 nm from an excitation light source 223 constituted by a light-emitting diode, a sine wave voltage with a DC bias of −375 V, an amplitude of 290 V, and a frequency of 1 kHz was applied to the electro-optic material 201. In addition, a camera was arranged at a position separated by 157.5 mm from an emission end surface of the KTN crystal (the electro-optic material 201), and a deflection angle was evaluated from a beam position photographed by the camera at an instantaneous voltage when phases are changed in 10°-units with respect to a drive voltage. When incident light with a wavelength of 1.06 μm is incident to a surface with an area of 3.2×2.0 mm², a total deflection angle in an x direction (a voltage application direction) was 22.5 mrad [(a) in FIG. 2].

In this case, an origin of the deflection angle was set at a position where light reaches the camera after passing through the KTN crystal which has not been charged with an electric charge and to which a voltage had not been applied. In a similar manner, when evaluating a beam position in a direction (a y direction) perpendicular to the voltage application direction and to an optical axis (a z direction), a deflection phenomenon of 0.92 mrad was observed [(b) in FIG. 2]. The results described above empirically demonstrate that a deflection deviation occurs in a direction perpendicular to the voltage application direction and to the optical axis and a pure one-dimensional scan is not performed.

Figure 10:
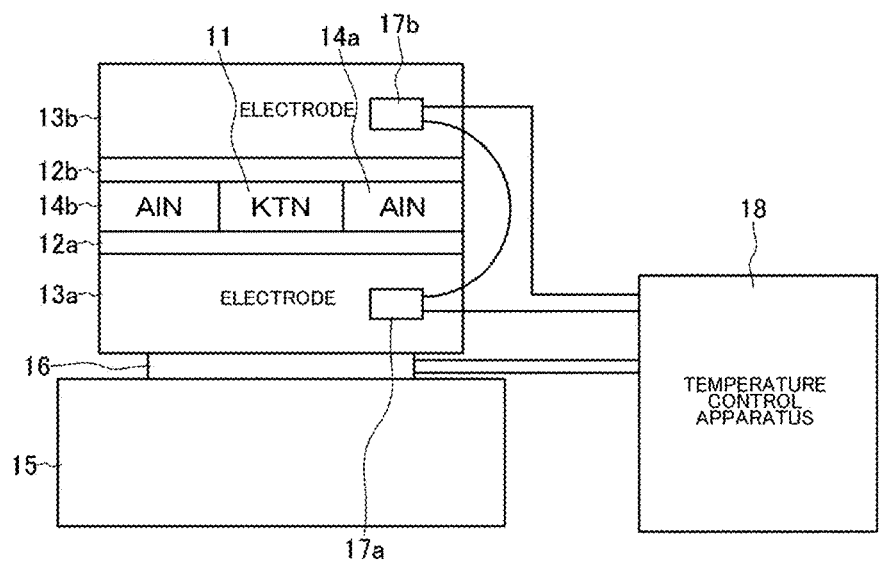
FIG. 10 is a configuration diagram showing a configuration of a conventional optical deflector using a KTN crystal.

In addition, outside of the conditions described above, a pure one-dimensional scan was also not performed when the two metallic blocks were set to the same temperature. Furthermore, a pure one-dimensional scan was also not performed in the case of the optical deflector shown in FIG. 10 using a KTN crystal which differs from the thickness (2.0 mm) of the KTN crystal described above and of which dimensions are 4.0×3.2×1.2 mm$^3$.

Figure 3:
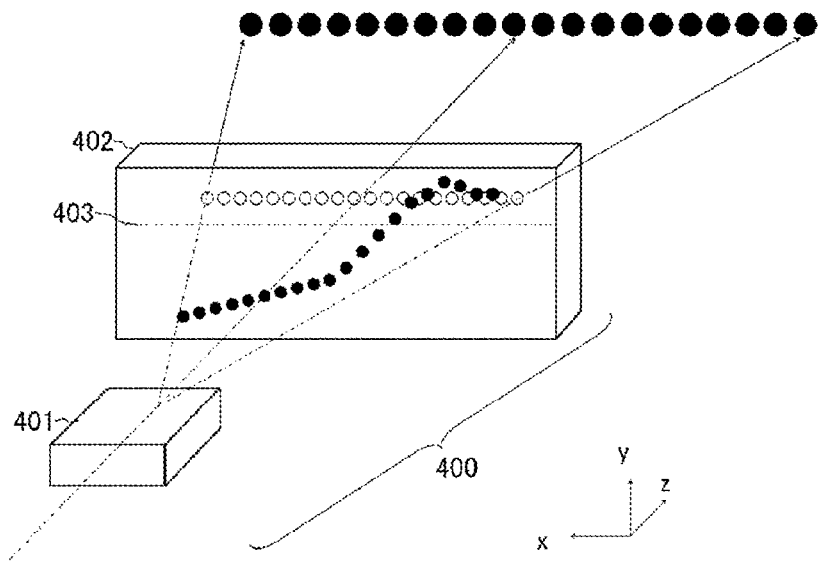
FIG. 3 is a perspective view showing a configuration of an optical deflection apparatus according to an embodiment of the present invention.
Figure 4:
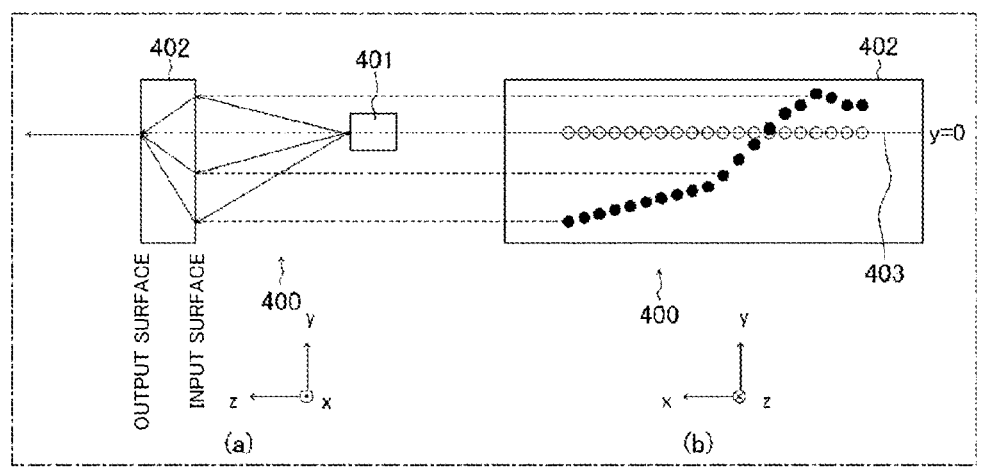
FIG. 4 is a plan view showing a configuration of the optical deflection apparatus according to an embodiment of the present invention.

Hereinafter, an optical deflection apparatus 400 according to an embodiment of the present invention will be described with reference to FIGS. 3, 4, and 5. The optical deflection apparatus 400 is provided with an optical deflection element 401 and a compensating optical element 402. The optical deflection element 401 deflects incident light in a first direction (a voltage application direction) in which a voltage is applied (one-dimensional scan). The optical deflection element 401 is constituted of an electro-optic material (an electro-optic crystal) of which a deflection angle changes depending on applied voltage. The electro-optic material may be any of a KTN [$KTa_{1-\alpha}Nb_\alpha O_3$ ($0<\alpha<1$)] crystal or a lithium-added KLTN [$K_{1-\beta}Li_\beta Ta_{1-\alpha}Nb_\alpha O_3$ ($0<\alpha<1$, $0<\beta<1$)] crystal.

The compensating optical element 402 is an element which has an incidence surface and an emission surface, which compensates for a deflection deviation in a second direction that is perpendicular to the first direction and to an optical axis of the incident light of deflected light having been deflected by the optical deflection element 401 and incident from the incidence surface, and which arranges a direction of travel of compensated light to be emitted from the emission surface on a same plane. A position of compensated light of which a deflection deviation is compensated for and which is emitted by the compensating optical element 402 in the second direction that passes through an emission surface (an output surface) of the compensating optical element 402 is not dependent on a deflection angle of the deflected light. In addition, the direction of travel of the compensated light is not dependent on the deflection angle due to the optical deflection element 401 with respect to the second direction.

Figure 2:
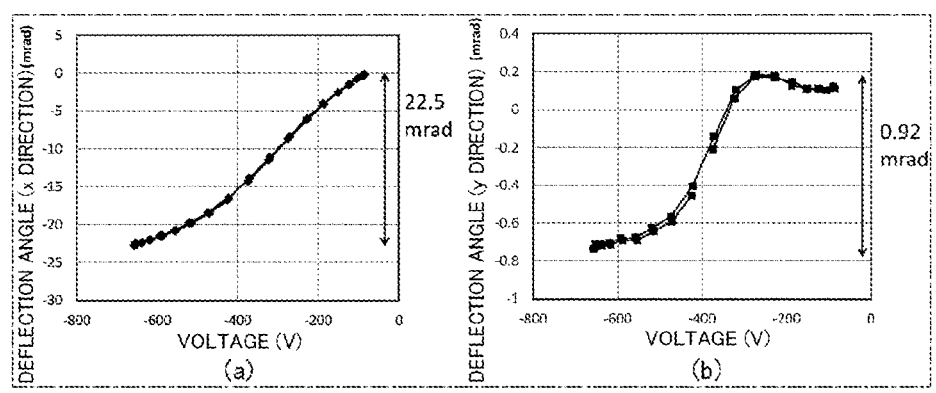
FIG. 2 is a characteristic diagram showing an experiment result of a deflection angle by an optical deflection element in a case where a compensating optical element is not used.

Now, let a deflection origin of the optical deflection element 401 be expressed as $(x, y, z)=(0, 0, 0)$. Light output from the optical deflection element 401 is input to the compensating optical element 402. Each one of black dots above the compensating optical element 402 shown in FIG. 3 represents a beam at a given moment on an input surface of the compensating optical element 402. A situation is shown where the beams are not only deflected in an original deflection direction (x direction: first direction) but are also deflected in a direction (y direction: second direction) that is perpendicular to the original deflection direction and to the optical axis (z direction) of the incident light as shown in (b) in FIG. 2. While the deflection angle in the y direction is sufficiently smaller than the deflection angle in the x direction, (b) in FIG. 2 shows the deflection angle in the y direction in an expanded (exaggerated) manner to emphasize that deflection also occurs in the y direction.

Supposing that an ideal one-dimensional scan is performed by the optical deflection element 401, locations where light passes through the input surface of the compensating optical element 402 are on a virtual line 403.

Center of gravity positions of light output from the compensating optical element 402 all satisfy y=0 on the output surface of the compensating optical element 402. In addition, a direction of travel of light output from the compensating optical element 402 is within a zx plane. (a) in FIG. 4 shows a configuration of the optical deflection apparatus 400 when viewed from a direction perpendicular to a yz plane. In addition, (b) in FIG. 4 shows a configuration of the optical deflection apparatus 400 when viewed from a direction perpendicular to an xy plane. Each of white dots shown in FIG. 3 and each of white dots shown in (b) in FIG. 4 represents a beam at a given moment on the output surface of the compensating optical element 402 and indicates that the center of gravity position of light on the output surface of the compensating optical element 402 is on y=0.

Figure 5:
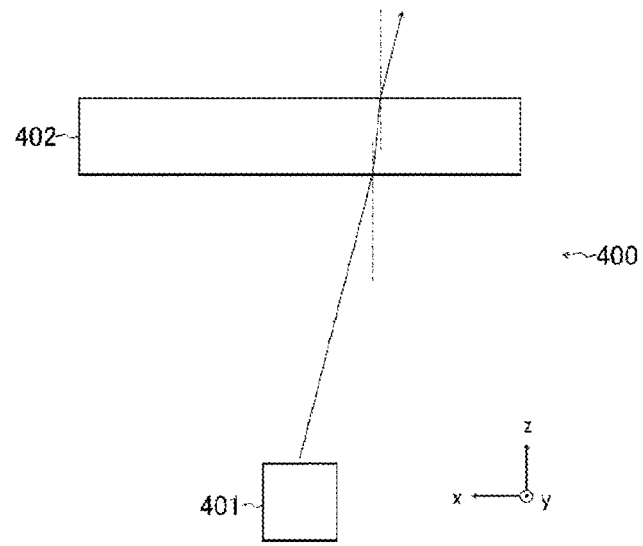
FIG. 5 is another plan view showing a configuration of the optical deflection apparatus according to an embodiment of the present invention.

FIG. 5 shows a configuration of the optical deflection apparatus 400 according to the embodiment when viewed from a direction perpendicular to the zx plane. When (a maximum value of an absolute value of) the deflection angle of the optical deflection element 401 is not too large and a thickness of the compensating optical element 402 is not too large, a light beam passing through the compensating optical element 402 can be approximated that a value of an x coordinate does not change between the incidence surface and the emission surface of the compensating optical element 402. An implementation of the compensating optical element 402 on the assumption that this approximation is true will be described below. In addition, in a part of the following description, a general case where shapes of the incidence surface (input surface) and the emission surface (output surface) of the compensating optical element 402 are dependent on x will be considered. In other words, a case where positions in the z direction of the incidence surface and the emission surface are not only dependent on y but also dependent on x will be considered.

A transmission type diffraction optical element is an implementation of the compensating optical element 402. The compensating optical element 402 can be used which is provided with diffraction optical elements formed on the incidence surface and the emission surface. As shown in (a) in FIG. 4, on the input surface of the compensating optical element 402 constituted by transmission type diffraction optical elements, input light that is input to each x coordinate is diffracted in the y direction so as to reach y=0 on the output surface. In addition, the light is once again diffracted on the output surface so that the light does not have a y component in a direction of travel. As a result, one-dimensional deflected light is obtained by the compensating optical element 402 constituted by transmission type diffraction optical elements.

Figure 6:
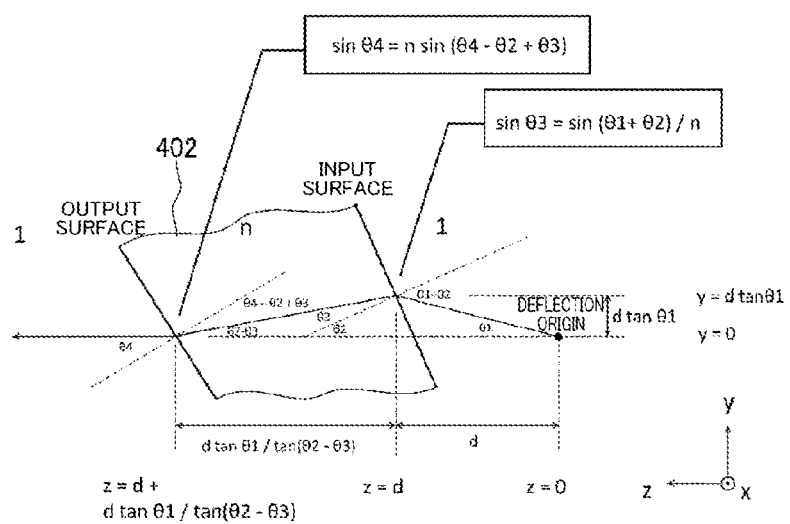
FIG. 6 is a configuration diagram showing a configuration example of a compensating optical element.

A material with a refractive index of n is another implementation of the compensating optical element 402. In this case, the compensating optical element 402 compensates for a deflection deviation in the second direction using refractions on the incidence surface and the emission surface. FIG. 6 shows a cross section at a given x of the compensating optical element 402 constituted of a material with a refractive index of n. Let a deflection angle in the y direction on the cross section of the compensating optical element 402 be denoted by $\theta 1$ (generally, $\theta 1$ is a function of x).

Assuming that a normal at a given x of the input surface of the compensating optical element 402 constituted of a material with a refractive index of n is inclined by an angle of $\theta 2$ (generally, $\theta 2$ is a function of x) with respect to the z axis, an incidence angle to the input surface is expressed as $\theta 1+\theta 2$. If an emission angle from the input surface is denoted by $\theta 3$, then according to Snell's law, $\sin \theta 3 = \sin(\theta 1+\theta 2)/n$ is satisfied. In other words, when n, $\theta 1$, and $\theta 2$ are provided, $\theta 3$ is determined.

A z component of the deflection origin position is 0. In addition, a z component of a position of an incidence point on the input surface of the material with a refractive index of n is denoted by d (generally, d is a function of x).

Light refracted by the input surface of the compensating optical element 402 constituted of a material with a refractive index of n satisfies y=0 at z=d+d tan θ1/tan(θ2−θ3). In other words, when the z component of a position on the output surface of the compensating optical element 402 constituted of a material with a refractive index of n satisfies z=d+d tan θ1/tan(θ2−θ3), beams of light output from the output surface of the compensating optical element 402 constituted of a material with a refractive index of n are all emitted from a point where y=0 is satisfied.

Let us assume that a normal at a given x of the output surface of the compensating optical element 402 is inclined by an angle of θ4 (generally, θ4 is a function of x) with respect to the z axis. If an emission angle from the output surface of the compensating optical element 402 constituted of a material with a refractive index of n is denoted by θ4 (generally, θ4 is a function of x), then according to Snell's law, sin θ4=n sin(θ4−θ2+θ3) is satisfied. In other words, selecting θ4 so as to satisfy this equation causes the emission angle from the output surface of the compensating optical element 402 constituted of a material with a refractive index of n to be θ4 and all of the beams of light output from the output surface of the compensating optical element 402 travel on the zx plane. In other words, a pure one-dimensional deflection operation is achieved.

While a case where light output from the compensating optical element 402 is propagated on the zx plane (y=0) has been considered in the description given above, conditions are to be eased if the light output from the compensating optical element 402 need only be simply deflected in a one-dimensional direction. For example, as shown in FIG. 7, a position of light output from a compensating optical element 802 may not satisfy y=0 on an output surface and a direction of travel of the light may not be parallel to the zx plane, and a plane woven by deflected light beams (a plane through which the light beams pass) needs only be a flat surface.

Figure 7:
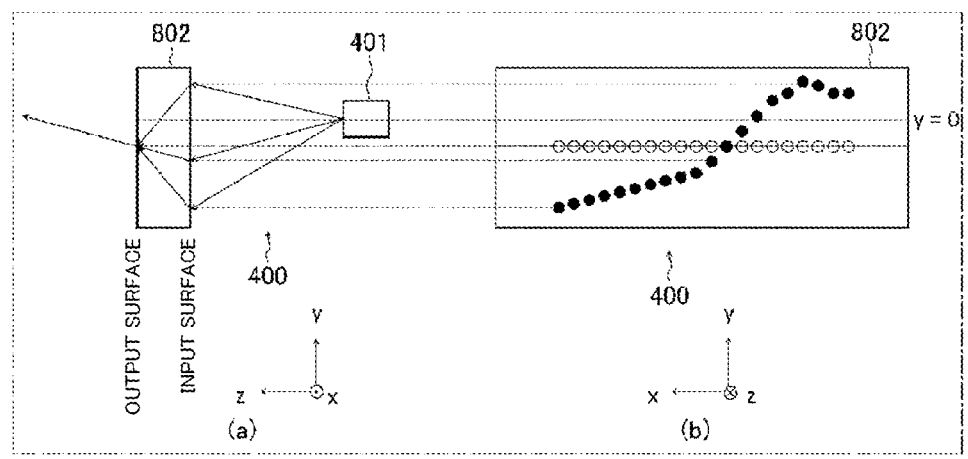
FIG. 7 is a plan view showing a configuration of another optical deflection apparatus according to an embodiment of the present invention.

Each of the white dots shown in FIG. 7 represents a beam at a given moment on the output surface of the compensating optical element 802 and indicates that the center of gravity position of light on the output surface of the compensating optical element 802 is not y=0. In a similar manner to the description given earlier, a transmission type diffraction grating is an implementation of the compensating optical element 802. A material with a refractive index of n is another implementation of the compensating optical element 802.

Figure 8:
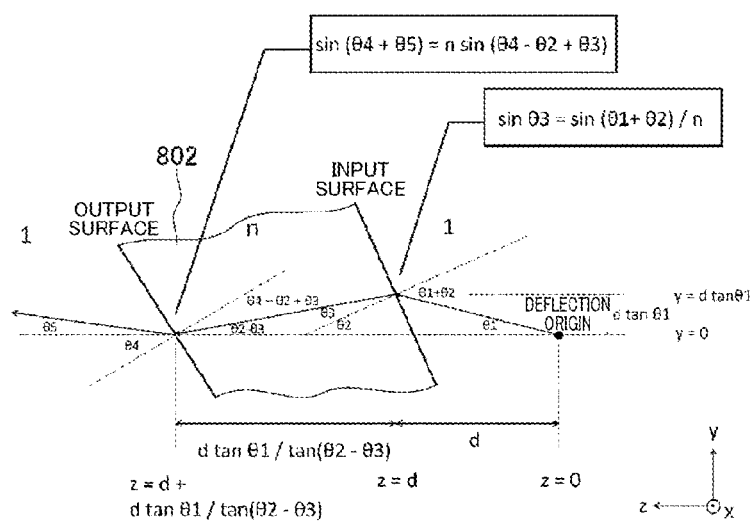
FIG. 8 is a configuration diagram showing a configuration example of a compensating optical element.

FIG. 8 shows a case where, while a position of light output from the compensating optical element 802 constituted of a material with a refractive index of n satisfies y=0 on the output surface, a direction of travel of light emitted from the output surface is not parallel to the zx plane. Let us assume that a normal at a given x of the output surface of the compensating optical element 802 constituted of a material with a refractive index of n is inclined by an angle of θ4 (generally, θ4 is a function of x) with respect to the z axis. If an emission angle from the output surface of the compensating optical element 802 constituted of a material with a refractive index of n is expressed as θ4+θ5 (generally, θ5 is a constant independent of x), then according to Snell's law, sin(θ4+θ5)=n sin(θ4−θ2+θ3) is satisfied. In other words, selecting θ4 so as to satisfy this equation causes all of the beams of light output from the output surface of the compensating optical element 802 constituted of a material with a refractive index of n to travel on a plane that is inclined by an angle θ5 relative to the zx plane. In other words, a pure one-dimensional deflection operation is achieved.

Figure 9:
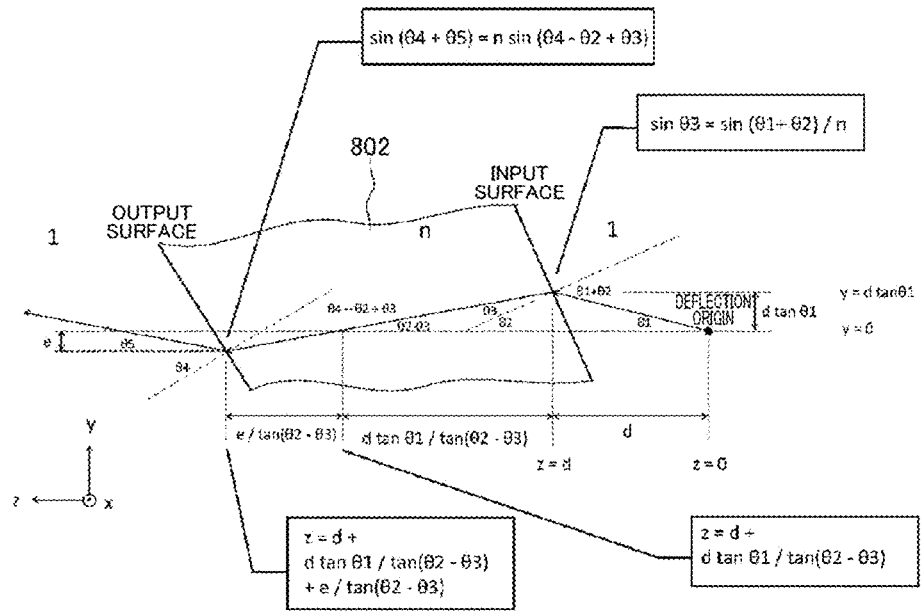
FIG. 9 is a configuration diagram showing a configuration example of the compensating optical element.

FIG. 9 shows a case where a position of light output from the compensating optical element 802 constituted of a material with a refractive index of n does not satisfy y=0 on the output surface and a direction of travel of the light is not parallel to the zx plane. Let e denote a constant independent of x. Light refracted by the input surface of the compensating optical element 802 constituted of a material with a refractive index of n satisfies y=−e at z=d+d tan θ1/(θ2−θ3)+e/tan(θ2−θ3). In other words, when the z component of a position on the output surface of the compensating optical element 802 constituted of a material with a refractive index of n satisfies z=d+d tan θ1/tan(θ2−θ3)+e/tan(θ2−θ3), beams of light output from the output surface of the compensating optical element 802 are all emitted from a point where y=−e is satisfied.

Let us assume that a normal at a given x of the output surface of the compensating optical element 802 constituted of a material with a refractive index of n is inclined by an angle of θ4 (generally, θ4 is a function of x) with respect to the z axis. If an emission angle from the output surface of the compensating optical element 802 constituted of a material with a refractive index of n is expressed as θ4+θ5 (generally, θ5 is a constant independent of x), then according to Snell's law, sin(θ4+θ5)=n sin(θ4−θ2+θ3) is satisfied. In other words, selecting θ4 so as to satisfy this equation causes all of the beams of light output from the output surface of the compensating optical element 802 constituted of a material with a refractive index of n to travel on a plane that is inclined by an angle θ5 relative to the zx plane. In other words, a pure one-dimensional deflection operation is achieved.

It should be noted that the compensating optical element can be provided with a diffraction optical element on the incidence surface, and the emission surface can compensate for a deflection deviation in the second direction using refractions. In addition, the compensating optical element can also be provided with a diffraction optical element on the emission surface, and the incidence surface can compensate for a deflection deviation in the second direction using refractions. While general cases where shapes of an incidence surface and an emission surface of a compensating optical element may be dependent on x have been considered above, in reality, it is difficult to form the incidence surface and the emission surface so that their shapes are dependent on x. Therefore, cases where the shapes of the incidence surface and the emission surface of the compensating optical element are respectively independent of x will be considered. In other words, cases where positions in the z direction of the incidence surface and the emission surface of the compensating optical element are independent of x will be considered. Forming such an incidence surface and an emission surface of the compensating optical element is more preferable in terms of simplicity of fabrication.

First, the incidence surface will be considered. Forming the incidence surface so that, even if an incidence angle in the y direction to the incidence surface changes at a given x, a center of gravity position of light in the y direction passes a desired position on the output surface is possible both when a diffraction optical element is used and when refractions are used. Therefore, the shape of the incidence surface can be made independent of x both when a diffraction optical element is used and when refractions are used.

Next, the emission surface will be considered. First, a case where refractions on the emission surface are used will be considered. Although a deflection angle in the y direction of light output from the output surface must be constant regardless of a deflection angle in the y direction to the emission surface, considering Snell's law shown in (a) in FIG. 4 and the like, this is unrealizable. On the other hand, the use of a diffraction optical element makes this realizable.

As described above, embodiments of the present invention can provide an optical deflection apparatus in which a deflection deviation in a direction perpendicular to a voltage application direction is suppressed by including a compensating optical element to which deflected light having been deflected by an optical deflection element is incident, which compensates for a deflection deviation in a second direction that is perpendicular to a first direction, and which arranges a direction of travel of compensated light to be emitted on a same plane, and light output from the optical deflection apparatus can be one-dimensionally deflected.

It is to be understood that the present invention is not limited to the embodiments described above and that many modifications and combinations will obviously occur to those skilled in the art without departing from the technical scope of the present invention.

REFERENCE SIGNS LIST

400 Optical deflection apparatus
401 Optical deflection element
402 Compensating optical element
403 Virtual line

The invention claimed is:

1. An optical deflection apparatus comprising:
   an optical deflection element configured to deflect incident light in a first direction in which a voltage is applied; and
   a compensating optical element comprising an incidence surface and an emission surface, wherein a diffraction optical element is disposed directly on and in direct physical contact with the incidence surface or the emission surface, and wherein the compensating optical element is configured to:
      compensate for a deflection deviation in a second direction that is perpendicular to the first direction and to an optical axis of the deflected incident light deflected by the optical deflection element and incident from the incidence surface; and
      arrange a direction of travel of the compensated light to be emitted from the emission surface on a single plane.

2. The optical deflection apparatus according to claim 1, wherein:
   a position in the second direction on the emission surface of the compensated light of which the deflection deviation has been compensated for by the compensating optical element is independent of a deflection angle of the deflected light by the optical deflection element; and
   the direction of travel of the compensated light is independent of the deflection angle in the second direction.

3. The optical deflection apparatus according to claim 2, wherein the diffraction optical element is disposed on the incidence surface and the emission surface.

4. The optical deflection apparatus according to claim 2, wherein the compensating optical element is configured to compensate for the deflection deviation in the second direction using refractions on the incidence surface or the emission surface.

5. The optical deflection apparatus according to claim 2, wherein the compensating optical element is configured to compensate for the deflection deviation in the second direction using refractions on the incidence surface and the emission surface.

6. The optical deflection apparatus according to claim 1, wherein the optical deflection element comprises an electro-optic material.

7. The optical deflection apparatus according to claim 6, wherein the electro-optic material comprises a KTN [$KTa_{1-\alpha}Nb_{\alpha}O_3$ $(0<\alpha<1)$] crystal or a lithium-added KLTN [$K_{1-\beta}Li_{\beta}Ta_{1-\alpha}Nb_{\alpha}O_3$ $(0<\alpha<1, 0<\beta<1)$] crystal.

8. The optical deflection apparatus according to claim 1, wherein the optical deflection element comprises:
   an electro-optic material;
   a first metallic block disposed on a first side of the electro-optic material and a second metallic block disposed on a second side of the electro-optic material;
   a first carbon sheet disposed on the first side of the electro-optic material between the first metallic block and the electro-optic material and a second carbon sheet disposed on the second side of the electro-optic material between the second metallic block and the electro-optic material;
   a first thermistor embedded inside the first metallic block and a second thermistor embedded inside the second metallic block;
   a first Peltier element coupled to the first metallic block and a second Peltier element coupled to the second metallic block; and
   a first heat sink coupled to the first Peltier element and a second heat sink coupled to the second Peltier element.

9. The optical deflection apparatus according to claim 8, further comprising:
   a first temperature control apparatus configured to perform temperature control of the first metallic block by adjusting a current supplied to the first Peltier element; and
   a second temperature control apparatus configured to perform temperature control of the second metallic block by adjusting a current supplied to the second Peltier element independently of the first temperature control apparatus.

10. A method of forming an optical deflection apparatus, the method comprising:
    forming an optical deflection element that deflects incident light in a first direction in which a voltage is applied; and
    forming a compensating optical element comprising an incidence surface and an emission surface, wherein a diffraction optical element is disposed directly on and in direct physical contact with the incidence surface or the emission surface, and wherein the compensating optical element compensates for a deflection deviation in a second direction that is perpendicular to the first direction and to an optical axis of the deflected incident light deflected by the optical deflection element and incident from the incidence surface and arranges a direction of travel of the compensated light to be emitted from the emission surface on a single plane.

11. The method according to claim 10, wherein:
    a position in the second direction on the emission surface of the compensated light of which the deflection deviation has been compensated for by the compensating optical element is independent of a deflection angle of the deflected light by the optical deflection element; and the direction of travel of the compensated light is independent of the deflection angle in the second direction.

12. The method according to claim 11, wherein the diffraction optical element is disposed on the incidence surface and the emission surface.

13. The method according to claim 11, wherein the compensating optical element compensates for the deflection deviation in the second direction using refractions on the incidence surface or the emission surface.

14. The method according to claim 11, wherein the compensating optical element compensates for the deflection deviation in the second direction using refractions on the incidence surface and the emission surface.

15. The method according to claim 10, wherein the optical deflection element comprises an electro-optic material.

16. The method according to claim 15, wherein the electro-optic material comprises a KTN [$KTa_{1-\alpha}Nb_\alpha O_3$ ($0<\alpha<1$)] crystal or a lithium-added KLTN [$K_{1-\beta}Li_\beta Ta_{1-\alpha}Nb_\alpha O_3$ ($0<\alpha<1$, $0<\beta<1$)] crystal.

17. The method according to claim 10, wherein the optical deflection element comprises:
   an electro-optic material;
   a first metallic block disposed on a first side of the electro-optic material and a second metallic block disposed on a second side of the electro-optic material;
   a first carbon sheet disposed on the first side of the electro-optic material between the first metallic block and the electro-optic material and a second carbon sheet disposed on the second side of the electro-optic material between the second metallic block and the electro-optic material;
   a first thermistor embedded inside the first metallic block and a second thermistor embedded inside the second metallic block;
   a first Peltier element coupled to the first metallic block and a second Peltier element coupled to the second metallic block; and
   a first heat sink coupled to the first Peltier element and a second heat sink coupled to the second Peltier element.

18. The method according to claim 17, further comprising:
   performing temperature control of the first metallic block using a first temperature control apparatus by adjusting a current supplied to the first Peltier element; and
   performing temperature control of the second metallic block using a second temperature control apparatus by adjusting a current supplied to the second Peltier element independently of the first temperature control apparatus.

19. An optical deflection apparatus comprising:
   an optical deflection element configured to deflect incident light in a first direction in which a voltage is applied, wherein the optical deflection element comprises:
      an electro-optic material;
      a first metallic block disposed on a first side of the electro-optic material and a second metallic block disposed on a second side of the electro-optic material;
      a first carbon sheet disposed on the first side of the electro-optic material between the first metallic block and the electro-optic material and a second carbon sheet disposed on the second side of the electro-optic material between the second metallic block and the electro-optic material;
      a first thermistor embedded inside the first metallic block and a second thermistor embedded inside the second metallic block;
      a first Peltier element coupled to the first metallic block and a second Peltier element coupled to the second metallic block; and
      a first heat sink coupled to the first Peltier element and a second heat sink coupled to the second Peltier element; and
   a compensating optical element comprising an incidence surface and an emission surface, wherein a diffraction optical element is disposed on the incidence surface or the emission surface, and wherein the compensating optical element is configured to:
      compensate for a deflection deviation in a second direction that is perpendicular to the first direction and to an optical axis of the deflected incident light deflected by the optical deflection element and incident from the incidence surface; and
      arrange a direction of travel of the compensated light to be emitted from the emission surface on a single plane.

20. The optical deflection apparatus according to claim 19, further comprising:
   a first temperature control apparatus configured to perform temperature control of the first metallic block by adjusting a current supplied to the first Peltier element; and
   a second temperature control apparatus configured to perform temperature control of the second metallic block by adjusting a current supplied to the second Peltier element independently of the first temperature control apparatus.

* * * * *